(12) United States Patent
Peranandam et al.

(10) Patent No.: US 11,218,843 B1
(45) Date of Patent: Jan. 4, 2022

(54) SYSTEMS AND METHODS FOR VEHICLE-TARGET LOCALIZATION

(71) Applicant: GM GLOBAL TECHNOLOGY OPERATIONS LLC, Detroit, MI (US)

(72) Inventors: Prakash Mohan Peranandam, Rochester Hills, MI (US); Jiyu Zhang, Sterling Heights, MI (US); Erik B. Golm, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/141,508

(22) Filed: Jan. 5, 2021

(51) Int. Cl.
*H04W 4/029* (2018.01)
*H04B 17/318* (2015.01)
*H04W 4/40* (2018.01)
*H04W 4/02* (2018.01)

(52) U.S. Cl.
CPC .......... *H04W 4/029* (2018.02); *H04B 17/318* (2015.01); *H04W 4/023* (2013.01); *H04W 4/40* (2018.02)

(58) Field of Classification Search
CPC .................................................... H04W 4/029
See application file for complete search history.

(56) References Cited

U.S. PATENT DOCUMENTS

| | | | | |
|---|---|---|---|---|
| 9,836,057 | B2* | 12/2017 | Fairfield | G08G 1/202 |
| 2015/0006005 | A1* | 1/2015 | Yu | G06Q 50/28 |
| | | | | 701/22 |
| 2015/0377635 | A1* | 12/2015 | Beaurepaire | G01C 21/3423 |
| | | | | 701/408 |
| 2016/0255472 | A1* | 9/2016 | Wise | H04W 4/023 |
| | | | | 455/457 |

* cited by examiner

*Primary Examiner* — Joseph H Feild
*Assistant Examiner* — Pameshanand Mahase
(74) *Attorney, Agent, or Firm* — Lorenz and Kopf LLP (57) ABSTRACT

Systems and methods for vehicle-target localization, identification and indication. The system includes a vehicle module operating onboard a vehicle and configured to receive a request for a tether and send the tether responsive thereto, and a target module operating on a target external to the vehicle. The target module can generate target profile data (TPD) comprising location information for the target, such as, a first component that is a function of a detected first WiFi signal having a first signal strength. The request for the tether including the TPD is transmitted to the vehicle module; a tether of secured communications is established between the vehicle module and target module. Real-time TPD is exchanged during the tether and the vehicle module performs the V-T localization as a function of the RT TPD, and commands the vehicle based on V-T localization data.

20 Claims, 3 Drawing Sheets

SYSTEMS AND METHODS FOR VEHICLE-TARGET LOCALIZATION

TECHNICAL FIELD

The present disclosure generally relates to ride hail, package delivery/pickup, and vehicle summon applications for mobile platforms, and more particularly relates to systems and methods for vehicle-target localization.

Ride hail applications are relied upon for connecting a potential passenger with a vehicle, generally via a personal electronic device that the passenger wears or carries or via a system in an enabled transport object, "the target". Once the passenger and the vehicle are identified, vehicle-target localization may be performed to bring the vehicle to the target. As used herein, "localization" means the referencing of a signal source to its point of origin. With respect to a ride hail application, this means determining a location, in three-dimensional space, of the target using a signal/information transmitted from the target. In these scenarios, time is often of the essence, and it is desirable to locate the target quickly and accurately so that the vehicle can retrieve the target quickly. Sometimes these scenarios also require determining a best location for pickup and suggesting that the target move to the location so that the pickup is efficient and timely. In such scenario, the localization shall be applied vice-versa, that is, passenger/target to locate and reach the vehicle.

In some scenarios, a technical problem is presented by systems that rely on global positioning systems (GPS) for performing accurate vehicle-target localization. For example, in areas with many tall buildings crowded together or passenger requesting a ride from inside a building, the GPS signals can be unreliable and therefore the calculation of the locations may be sluggish, and the location accuracy can be degraded.

The following disclosure provides a technological solution to this technical problem, in addition to addressing related issues. Furthermore, other desirable features and characteristics of the system and method will become apparent from the subsequent detailed description and the appended claims, taken in conjunction with the accompanying drawings and the preceding background.

SUMMARY

Provided is an embodiment, of a system for vehicle-target (V-T) localization. The system includes: a vehicle module operating onboard a vehicle and configured to receive a request for a tether and send the tether responsive thereto; a target module operating in a target external to the vehicle, wherein the target module configured to: generate target profile data (TPD) comprising location information for the target, the TPD having a first component that is a function of a detected first WiFi signal having a first signal strength; transmit the request for the tether including the TPD; receive the tether from the vehicle module; and transmit real-time (RT) TPD to the vehicle module after receiving the tether; the vehicle module further configured to perform the V-T localization as a function of the RT TPD and transmit V-T localization data to the target module; the target module further configured to receive the V-T localization data from the vehicle module and update a status based thereon.

In an embodiment, the vehicle module is further configured to generate the tether to include vehicle profile data and a vehicle identification.

In an embodiment, the target module is further configured to generate the TPD further comprising a second component that is a function of a detected second WiFi signal having a second signal strength.

In an embodiment, the vehicle module is further configured to perform V-T localization by: parsing the RT TPD into its components; and referencing map data to locate a respective source ID for each component.

In an embodiment, the vehicle module is further configured to generate commands for drive systems of the vehicle as a function of the V-T localization.

In an embodiment, the vehicle module is further configured to generate commands for a display device in the vehicle as a function of the V-T localization.

In an embodiment, the target module is further configured to generate the TPD further including an encoded infrared component; and the vehicle module is further configured to parse the TPD into the encoded infrared component and utilize an onboard camera system in the performance of the V-T localization.

In an embodiment, the target module is further configured to: perform a validation step to authorize the tether; and only transmit the RT TPD when the tether is authorized.

In an embodiment, the validation step includes confirming that the tether was transmitted by an intended vehicle.

In an embodiment, the target is a personal electronic device or embedded system in an enabled transport object.

Also provided is a method for vehicle-target (V-T) localization. The method includes: at a vehicle module located onboard a vehicle, receiving a request for a tether for a target that is external to the vehicle; performing a preliminary target localization for the target as a function of components in the request for the tether; and transmitting the tether; and at a target module onboard the target, wherein the request for tether includes components of target profile data (TPD), generating the TPD to include a first component that is a function of a detected first WiFi signal having a first signal strength or its own WiFi ID information; transmitting the request for the tether including the TPD; receiving the tether from the vehicle module; and transmitting real-time (RT) TPD to the vehicle module responsive to receiving the tether; and at the vehicle module, further performing the V-T localization as a function of the RT TPD and transmitting V-T localization data to the target module.

In an embodiment, further including, at the vehicle module, generating the tether to include vehicle profile data and a vehicle identification.

In an embodiment, further including, at the target module, generating the TPD to further include a second component that is a function of a detected second WiFi signal having a second signal strength.

In an embodiment, further including, at the vehicle module: performing the V-T localization by parsing the RT TPD into its components; and referencing map data to locate a respective source ID for each component.

In an embodiment, further including, at the vehicle module, generating commands for drive systems of the vehicle as a function of the V-T localization.

In an embodiment, further including, at the vehicle module, generating commands for a display device in the vehicle as a function of the V-T localization.

In an embodiment, further including, at the target module, generating the TPD further including an encoded infrared component; and further including, at the vehicle module, parsing the TPD into the encoded infrared component and utilizing an onboard camera system in the performance of the V-T localization.

In an embodiment, further including, at the target module: performing a validation step to authorize the tether; and only transmitting the RT TPD when the tether is authorized.

In an embodiment, wherein the validation step includes confirming that the tether was transmitted by an intended vehicle.

In an embodiment, the target is a personal electronic device.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

As used herein, the term "module" may refer to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the functionality attributed to the module.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As mentioned, in some scenarios, such as, urban areas with many tall buildings crowded together, the GPS signals can be unreliable, the location determination can be slow, and the location accuracy can be degraded. This presents a technical problem for systems that rely on global positioning systems (GPS) for determining locations. In particular, this is a technical problem for ride hailing systems that need to quickly and accurately determine the location of the target and location of the vehicle making the pickup.

Exemplary embodiments provide a technological solution to this problem with a technologically enhanced vehicle-target localization system that implements an algorithm that combines the techniques of:

Analyzing target/vehicle WiFi/Bluetooth signal strengths and publicly available independent WiFi signal strengths, without connecting to any of them;

Detecting encoded infrared signals that are exchanged over a ride hail application, either with a zooming camera and/or with thermal imaging; and Employing Facial recognition using on an image provide by the target and an onboard zooming camera.

Combining map data and on board camera data to determine the exact passenger location on the vehicle camera image, in order to map the passenger's location from the camera image onto the vehicle display system.

Applications and modules that rely on vehicle-target localization, such as ride hail applications, may experience improved accuracy and speed when using the enhanced vehicle-target localization described herein, resulting in finding the target passenger accurate, sooner and more efficiently. The technologically enhanced vehicle-target localization systems and methods are described in more detail in connection with the figures below.

Figure 1:
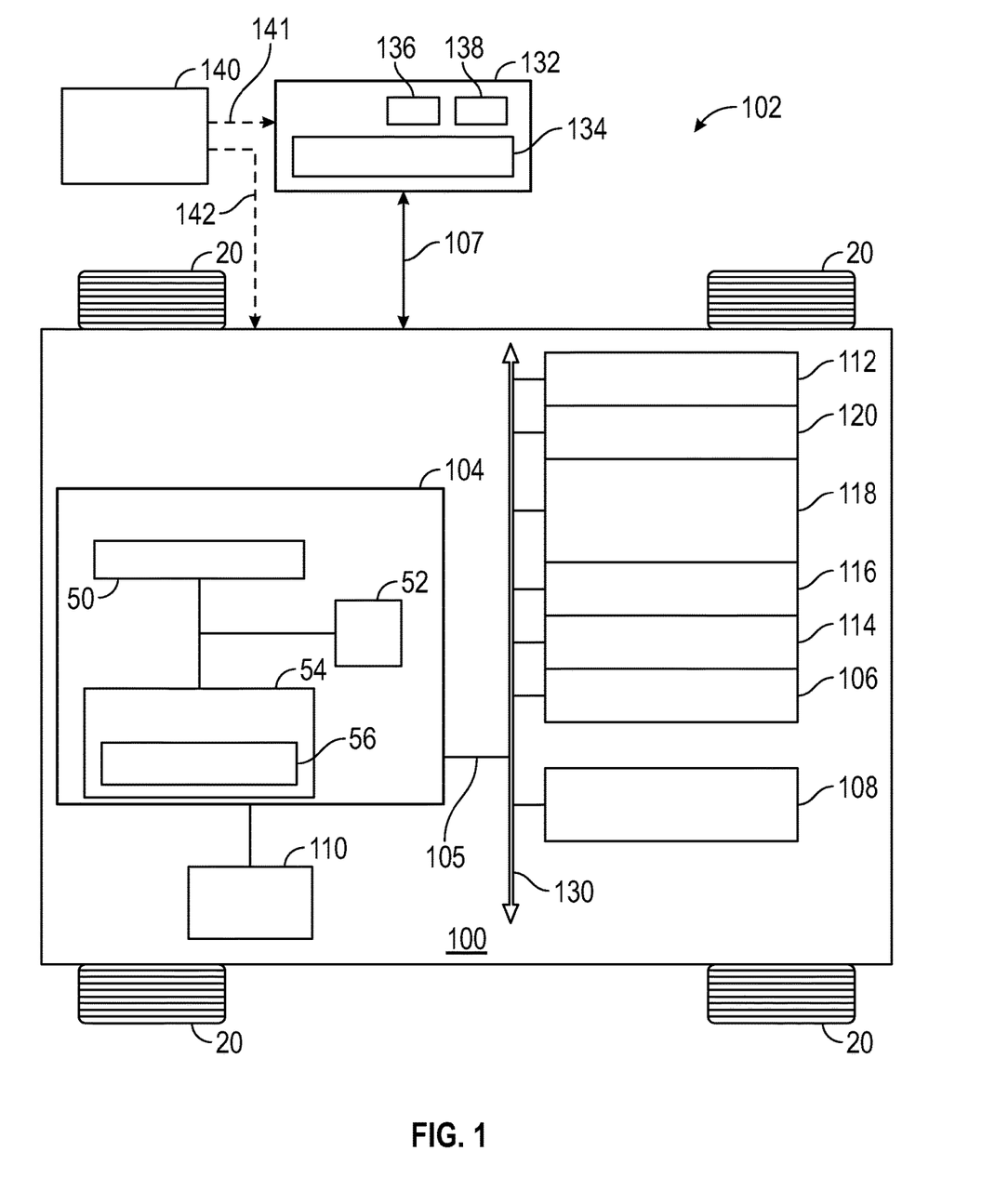
FIG. 1 is a schematic diagram illustrating a system for vehicle-target localization implemented onboard a vehicle, in accordance with various embodiments.

FIG. 1 depicts an example mobile platform. The example mobile platform is a vehicle 100 that is capable of movement, towing and carrying passengers from one location to another. The vehicle 100 is depicted in the illustrated embodiment as a passenger car, but other vehicle types, including motorcycles, taxi cabs, vehicle fleets, buses, sedans, wagons, trucks, sport utility vehicles, other automobiles, recreational vehicles (RVs), locomotives, and other vehicles may also be used. As is generally understood, the vehicle 100 may embody a body, chassis, and wheels 20, each of which are rotationally coupled to the chassis near a respective corner of the body. The vehicle 100 is depicted with four wheels 20, but the number of wheels 20 may vary in other embodiments. The vehicle 100 may be autonomous or semi-autonomous. The vehicle 100 includes at least a collective functional block, drive systems 106, which generally includes known vehicle systems for vehicle operation, such as, a propulsion system, a transmission system, a steering system, actuators for the wheels, and a brake system, and generates a variety of signals, including vehicle speed and vehicle acceleration. In various embodiments, the drive systems 106 are operationally coupled to one or more onboard components and systems via a communication bus 130.

A vehicle-target localization system, shown generally as system 102, includes a vehicle module 104 and a target module 134. The vehicle module 104 is onboard the vehicle 100 and communicates with, or has integrated therewith, a database 110 that includes map information and a transceiver 112. In various embodiments, the vehicle module 104 is communicatively coupled to onboard systems and components via the communication bus 130 as illustrated by connection 105. The vehicle module 104 may transmit commands and controls for the various onboard systems and components via connection 105 and the communication bus 130.

The transceiver 112 enables communication between onboard components and systems, as well as, between onboard systems and systems external to the vehicle 100. In various embodiments, the transceiver 112 includes the hardware and software to support one or more communication protocols for wireless communication between the vehicle module 104 and external sources, such as routers, internet, the cloud, satellites, communication towers and ground stations. The transceiver 112 may include sensors and circuits to support communications via WiFi and Bluetooth.

The target module 134 is externally located (i.e., external to the vehicle 100), in a target 132. In various embodiments, the target 132 takes the form of a personal electronic device (PED) or cellular phone that is worn or carried by a person and used to request a pickup, generally via a ride hail application installed on the target 132. In various embodiments, the target 132 takes the form of a system in an enabled transport object. In various embodiments, the target module 134 comprises a processor and a memory, and communicates with, or is integrated to include, a target transceiver 136 and a target (input/output) interface 138. In various embodiments, the target transceiver 136 may be functionally equivalent to the transceiver 112 and target interface 138 may be functionally equivalent to the user interface 114, each described below.

Returning to the vehicle 100, as mentioned, the vehicle 100 may include one or more other components and/or onboard systems that may each communicate with the vehicle module 104, generally via the communication bus 130. Non-limiting examples of the components include a central platform controller 108, user interface 114, display device 116, camera system 118, and audio device 120. The functions and operations of each of these components are described in more detail below.

The central platform controller 108 may receive and integrate communications from a variety of modules and systems known to be present in the above described vehicle 100. Accordingly, in some embodiments, the inputs provided by the central platform controller 108 to the vehicle module 104 may include user inputs, mobile applications and systems, off-board communications (e.g., via the transceiver 112), and a global positioning system (GPS).

The user interface 114 (and the target interface 138) may provide any combination of touch, voice, cursor, button press and gesture control for a passenger in the vehicle 100. Accordingly, the user interface 114 may be combined with the display device 116 and may also be combined with the audio device 120. The display device 116 may render various conformal and/or three-dimensional images of scenes external to the vehicle, as well as being used as part of an infotainment system. The display device 116 may include or integrate a head-up display (HUD), and may be capable of rendering augmented reality images. Likewise, the audio device 120 may emit sounds or speech, and may be used for alerting and for providing a passenger with information or entertainment.

The camera system 118 may include one or more optical cameras (e.g., forward facing, 360-degree, rear-facing, side-facing, stereo, etc.), thermal (e.g., infrared) cameras, and the like, mounted on the vehicle, and capable of zooming in and zooming out. The camera system 118 may include or be part of a front collision module (FCM), augmented reality camera (ARC), or the like. In operation, the camera system 118 senses light levels, luminance, edges, contrast, saturation of light, etc., and converts the sensed information into data which is may place on the communication bus 130. In an embodiment, the camera system 118 includes object recognition software. In another embodiment, the camera system includes facial recognition software. In another embodiment, the camera system 118 includes object recognition software and facial recognition software. In some embodiments, the camera system 118 is used in conjunction with the display device 116 in order to render augmented reality (AR) displays of areas external to the vehicle, for example to highlight a passenger.

In various embodiments, one to a plurality of separate and unique WiFi signals are in the environment around the vehicle 100 (WiFi signals 142) and around the target 132 (WiFi signals 141). The one to a plurality of separate and unique WiFi signals are each emitted by a respective WiFi source 140. In some embodiments, the presence of a WiFi signal and its corresponding signal strength is detected by a transceiver (such as target transceiver 136 or transceiver 112) and utilized in the generation of profile data, which is described in more detail below.

In various embodiments, as shown in FIG. 1, the vehicle module 104 is realized as an enhanced computer system, comprising computer readable storage device or media, memory 54, for storage of instructions, algorithms, and/or programs, such as vehicle-target localization algorithm and a plurality of preprogrammed thresholds and parameters, the processor 50 to execute the program 56, and input/output interface (I/O) 52. The computer readable storage device or media, memory 54, may include volatile and nonvolatile storage in read-only memory (ROM), random-access memory (RAM), and keep-alive memory (KAM), for example. KAM is a persistent or non-volatile memory that may be used to store various operating variables while the processor 50 is powered down. The memory 54 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 50 in controlling the vehicle 100. In various embodiments, processor 50 is configured to implement the system 102. The memory 54 may also be utilized by the processor 50 to cache data, to temporarily store results of comparisons and analyses, and the like. Information in the memory 54 may be organized and/or imported from an external source during an initialization or installment operation in a method; it may also be programmed via a user I/O interface.

The input/output interface (I/O) 52 may be operationally coupled to the processor 50 via a bus and enables intra-module 104 communication as well as extra-module 104 communication. The input/output interface (I/O) 52 may include one or more wired and/or wireless network interfaces and can be implemented using any suitable method and apparatus. In various embodiments, the input/output interface (I/O) 52 includes the hardware and software to support one or more communication protocols for wireless communication between the processor 50 and external sources, such as satellites, the cloud, communication towers and ground stations. In various embodiments, the input/output interface (I/O) 52 supports communication with technicians, and/or one or more storage interfaces for direct connection to storage apparatuses.

During operation of the system 102, the processor 50 loads and executes one or more algorithms, instructions, and rules embodied as program 56, and, as such, controls the general operation of the system 102. During operation of the system 102, the processor 50 may receive data from the communication bus 130 or external sources (such as WiFi signal(s) 142 and communications 107). In various embodiments of the system 102, the vehicle module 104 may: perform operations attributed to the system 102 in accordance with an algorithm; perform operations in accordance with state machine logic; and, perform operations in accordance with logic in a programmable logic array.

While the exemplary embodiment of the system 102 is described in the context of the vehicle module 104 implemented as a fully functioning enhanced computer system, those skilled in the art will recognize that the mechanisms of the present disclosure are capable of being distributed as a program product including program 56 and predefined parameters.

Figure 2:
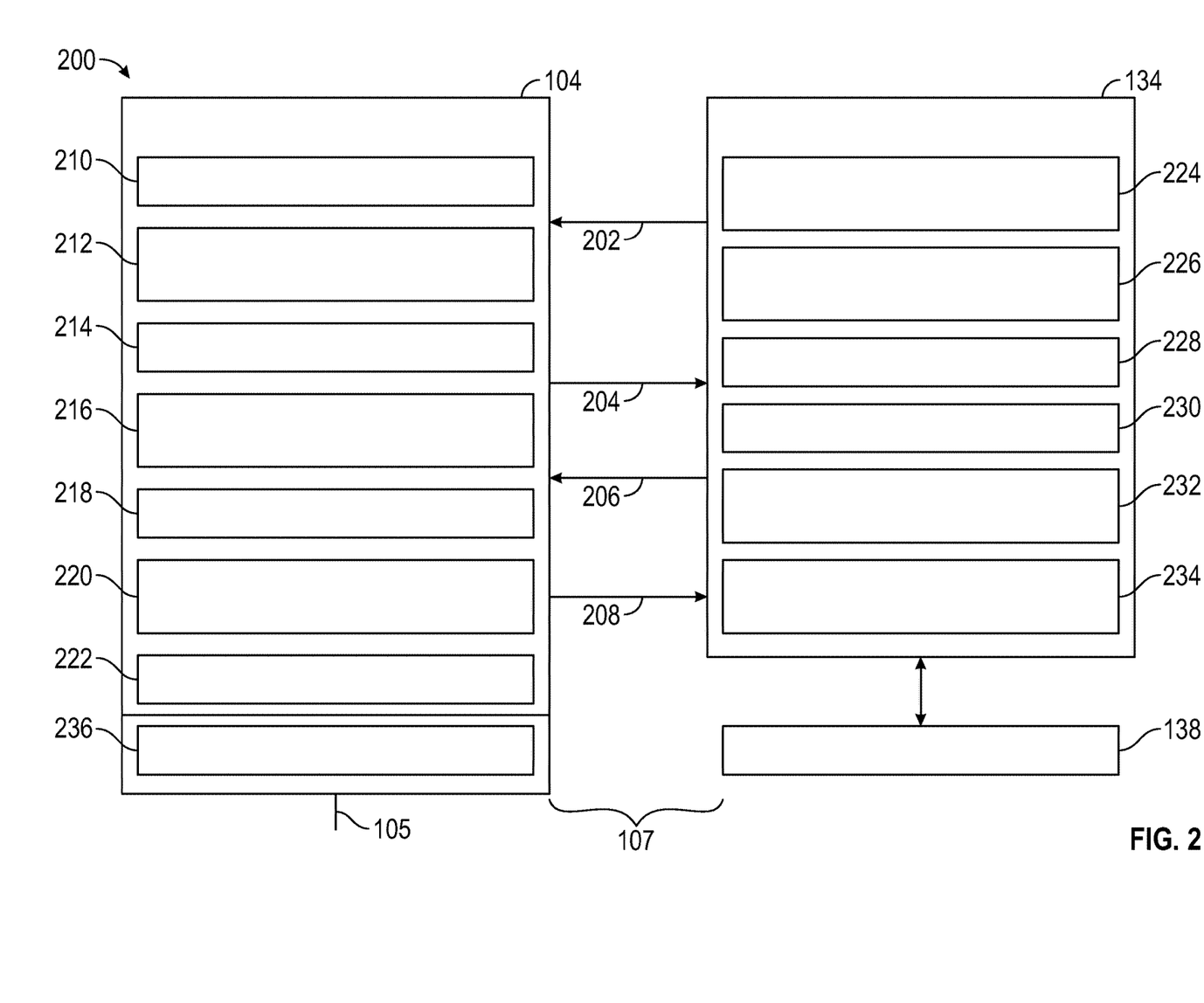
FIG. 2. is an architectural block diagram of one or more application modules that may be operating in the system for vehicle-target localization.

Turning now to FIG. 2, such a program product may comprise an arrangement of instructions organized as multiple interdependent program code modules 200, each configured to achieve a separate process and/or perform a separate algorithmic operation, arranged to manage data flow through the system 102. The program code modules 200 may each comprise an ordered listing of executable instructions for implementing logical functions for the processes performed by the system 102. The instructions in the program code modules 200, when executed by a processor (e.g. processor 50), cause the processor to receive and process signals, and perform logic, calculations, methods and/or algorithms as described herein for automatically and in real-time performing vehicle-target localization and generating associated commands.

Once developed, the program code modules 200 constituting a program product may be stored and distributed individually, or together, using one or more types of non-transitory computer-readable signal bearing media may be used to store and distribute the instructions, such as a non-transitory computer readable medium. Such a program product may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

In the example of FIG. 2, the program code modules 200 are generally divided between the vehicle module 104 and the target module 134, which exchange communications 107, described in more detail below. In an application, each module may be realized as one or more sub-modules. In many scenarios, vehicle-target localization is triggered by a passenger's request for a pickup via a ride hailing application on the passenger's PED. Therefore, the processes performed in the target module are described first.

In an embodiment, the target module 134 may include a module 224 for generating target profile data (TPD), which may activate when a user requests (e.g., via the target interface 138) a pickup by a vehicle. Responsive to receiving the user's request, the module 224 may generate profile data for the target, which is referred to as target profile data (TPD). Profile data has specific meaning herein, as described below.

Profile data comprises non-GPS-acquired information about a location. Profile data generally includes target profile data (TPD) and vehicle profile data (VPD). In various embodiments, profile data includes a snapshot of a sensed WiFi environment, which generally means what signals are available and how strong they are, and TPD also includes, for the sender, its own WiFi information (e.g., self-identifying WiFi identification and capability/components). With respect to WiFi profile data, a WiFi source 140 identification (ID) and its associated signal strength comprise one component of profile data. When there a plurality of detectable WiFi signals, each WiFi source 140 identification and associated signal strength of the plurality of WiFi signals comprise one component of profile data. Said differently, the profile data can include one component or a plurality of components.

For example, target 132 is able to detect (e.g., by the target transceiver 136) a first WiFi signal 141, sourced from a fast food restaurant (the first source ID), with an associated first signal strength. In this example, the module 224 may generate target profile data having a first component that is a function of the detected first WiFi signal having a first signal strength. This may look like a data string {first source ID, first signal strength}.

In another example, target 132 is able to detect a first WiFi signal 141, sourced from a fast food restaurant (the first source ID), with an associated first signal strength, and a second WiFi signal, sourced from a business (the second source ID), with an associated second signal strength. In this example, the module 224 may generate target profile data that includes {first source ID, first signal strength; second source ID, second signal strength}. In other embodiments, there are more than two WiFi sources. In some embodiments, profile data comprises an assigned infrared code. In some embodiments, profile data comprises Bluetooth signals, their sources, and their signal strength. In some embodiments, the profile data embodies any combination of WiFi, infrared, and Bluetooth data.

Returning now to the operations of target module 134, the module 226 takes the TPD and combines it with identifying information for the target, which is referred to as target information. Target information may include, for example, a person's name or a structure name (e.g., a bridge). In some embodiments, target information includes a camera image of the passenger. The module 226 transmits a request for contact. In various embodiments, the request for contact may be a data package that includes the TPD and the target information. The request for contact may be referred to herein as a request 202 for tether.

The target module 134 is also configured to receive a tether 204, which includes at least a secure communication with a vehicle 100. In various embodiments, the tether 204 includes information encoded in it, such as, a vehicle identification, vehicle profile data, or other information related to the requested pickup. In various embodiments, the reception of a tether 204 is after, and responsive to, having requested it. In the example, the receiving tether module 228 receives the tether 204 from the vehicle module 104 and the authorizing tether module 230 performs validation steps to authorize the tether 204. For example, the authorizing tether module 230 may parse information encoded in the tether 204 (such as, a vehicle ID and vehicle location) and then perform validation steps on the information encoded in the tether 204. In various embodiments, a validation step may be to confirm that the tether 204 was transmitted by an intended vehicle 100. In various embodiments, a validation step may be to confirm that the tether 204 comes from a vehicle 100 that is deemed safe, etc. In various embodiments, multiple validations may be required, and only when all validation steps have passed, the tether 204 is deemed authorized. In an embodiment, if the tether 204 is not authorized by module 230, it may be ignored. In an embodiment, if the tether 204 is not authorized by module 230, the module 230 may block further transmission and reception with the source of the tether 204.

When the tether 204 is authorized, the target module 134 and the vehicle module 104 begin a continuous communication until the pickup occurs, or a termination event occurs. A module 232 may manage the continuous communication, which can take the form of a high frequency sampling and transmission of real-time (RT) TPD 206 to the vehicle module 104 (this is referred to as RT TPD, only to distinguish from the initially transmitted TPD). In practice, once module 232 begins a continuous transmission of TPD (RT TPD) to the vehicle module 104, it generally continues until the vehicle 100 arrives to the location of the target 132, this is because the vehicle module 104 processes the RT TPD 206 to perform the vehicle-target localization and guide the vehicle 100 to the target based thereon. Said differently, for the duration of an authorized tether, information will be exchanged between the vehicle module 104 and the target module 134 to accomplish bringing the vehicle 100 to the target 132 for the pickup.

During the course of the continuous transmission of real-time (RT) TPD 206 to the vehicle module 104, the target module may begin receiving vehicle-target (V-T) localization data 208. Module 234 updates a status of the V-T localization based on the received V-T localization data 208. In order to update the status, module 234 may generate commands for the target interface 138, such as, display commands for a display device and/or audio commands for an audio device, for example. When the target is a personal electronic device, a user may view the updates or listen to them.

Turning now to focus on the vehicle module 104, vehicle module 104 is configured to be receptive to incoming requests 202 for tether via a plurality of different communication protocols. In the example, a module 210 for receiving a request for tether receives the request 202 and may parse components of the request 202 into the target information and the TPD. In some embodiments, the request 202 will be parsed into the potentially multiple different components described above.

In some embodiments, a module 212 may generate a preliminary target localization as a function of the TPD in the request 202, for example, by triangulating information from the components. In some embodiments, the preliminary target localization is also performed by comparing a known vehicle 100 current location and/or the VPD to the components in the TPD. The preliminary target localization output may include an estimated distance between the vehicle 100 and target 132, as well as a general vector direction between them, in three dimensions. In various embodiments, performing the preliminary target localization includes utilizing a WiFi signal analyzer and/or an infrared signal analyzer.

At module 214, the vehicle module may generate its own vehicle profile data (VPD), for including in the tether 204. As with the target profile data, the VPD may include its own WiFi identification (ID) and associated self-identifying information. A module 216 may transmit a tether 204 with VPD therein.

As mentioned above, at some point during the authorized tether, the target module 134 begins transmitting RT TPD to the vehicle module 104. A module 220 may perform the V-T localization using the RT TPD. The V-T localization may begin by parsing components of the RT TPD. In various embodiments, V-T localization may include referencing the map data from database 110 for each component of the TPD to locate the respective source ID. Continuing with the example above, the vehicle module 104 may locate the fast food restaurant on the map and the business on the map, and use the respective signal strengths to determine how close the target 132 may be to each of the sources, and to triangulate a location of the target 132. By knowing a target is able to detect a source, and how strong the source's signal is at the target, the vehicle module 104 can adjust the scope of the search area expected to include the location for the target 132 (the vehicle-target localization).

The steps of receiving the RT TPD and performing the vehicle-target localization on the RT TPD are cycled. Each update to the TPD and each additional component of the TPD can be overlaid with earlier received TPD and with the other components and the map data to continually decrease the scope of the search area expected to include the location for the target 132. The more contracted the scope is, the more accurate the V-T localization is. Often, the more components in the RT TPD received, the greater the confidence in the V-T localization, and the greater the precision of the V-T localization.

During the V-T localization, the vehicle module 104 may identify other buildings and structures nearby the target, using the map data. In various embodiments, the vehicle module 104 may assign GPS coordinates to the target, as a function of processing the TPD with the map data. In various embodiments, the vehicle module 104 may process the RT TPD to construct a trajectory of the target, if the target is moving (e.g., a person is walking on the street).

During the course of the V-T localization, the vehicle module 104 may generate commands, sent via connection 105 (e.g., by module 236) to guide the vehicle 100 to the target 132. The commands that are generated by vehicle module 104 may go directly to the drive systems 106 and/or central platform controller 108, for example, when the vehicle is autonomous. The commands may also go to the audio device 120 and display device 116, for example when the vehicle is semi-autonomous, and there is either a passenger or driver in the vehicle 100. The commands may cause the display device 116, in the form of a HUD, to display a bounding box around a pedestrian, to indicate that the pedestrian is the target 132.

In various embodiments, the vehicle module 104 shares the V-T localization (e.g., by module 222) with the target module 134, as indicated by V-T localization data 208 in FIG. 2. As part of sharing the V-T localization data 208, the vehicle module may further calculate a suitable pickup location and transmit a suggested walking route for the pedestrian to the calculated suitable pickup location, for example. In various embodiments, such as in a vehicle summons application, after summoning the vehicle to the passenger's location, the system 102 can be utilized by the passenger, to localize, identify and indicate the vehicle 100 (e.g., generating and alerting regarding any combination of information such as, a make/model, color, and license plate of the vehicle 100, and the direction it is coming from). In an embodiment, the target module 134 may employ graphics rendering techniques, such as presenting on a PED a display of the area around the passenger and using a bounding box and/or directional indicators to distinguish the vehicle 100 from among a plurality of vehicles.

As mentioned, the target information may include a camera image of the passenger. Responsive to determining this, the vehicle module 104 may engage the camera system 118 to pan and zoom on the environment, and to take images of pedestrians, and to perform facial recognition on the pedestrians, compared to the camera image of the passenger, to assist in finding the target 132. Once the target 132 is located, augmented reality may be used on the display device 116 to emphasize the person associated with the target 132 from among a plurality of pedestrians.

Figure 3:
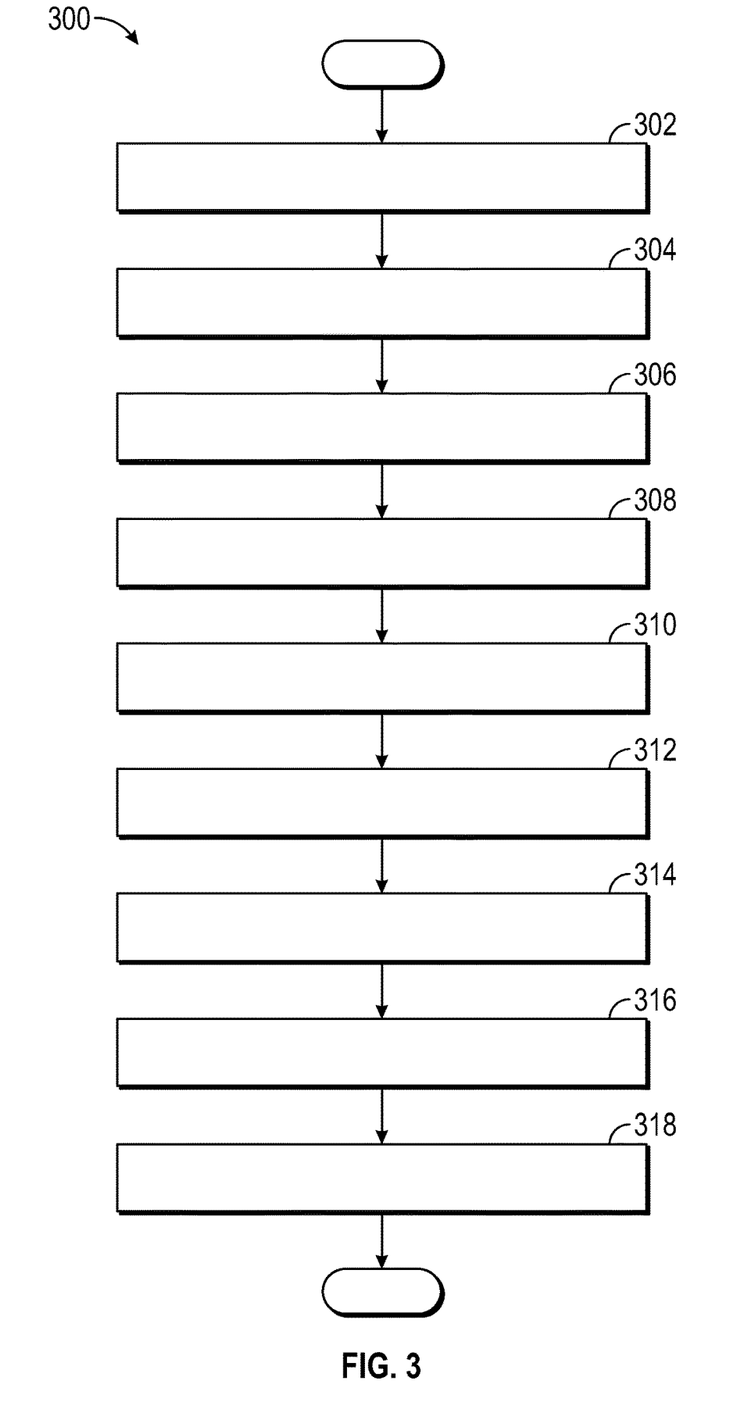
FIG. 3 is a process flow chart depicting an example method for vehicle-target localization in a mobile platform, in accordance with various embodiments.

Turning now to FIG. 3, the system 102 described above may be implemented by a processor-executable method for vehicle-target localization, shown generally as method 300. For illustrative purposes, the following description of method 300 may refer to elements mentioned above in connection with FIGS. 1-2. In practice, portions of method 300 may be performed by different components of the described system 102. It should be appreciated that method 300 may include any number of additional or alternative operations and tasks, the tasks shown in FIG. 3 need not be performed in the illustrated order, and method 300 may be incorporated into a more comprehensive procedure or method, such as a ride-sharing application, having additional functionality not described in detail herein. Moreover, one or more of the tasks shown in FIG. 3 could be omitted from an embodiment of the method 300 if the intended overall functionality remains intact.

At 302, the system 102 is initialized. When implemented as an enhanced computer system (e.g., FIG. 1), initialization at 302 may comprise uploading, installing, or updating the instructions constituting the program 56 and preprogrammed variables for execution by the processor 50.

At 304, the V-T localization process may be triggered. In various embodiments, this implies that a pedestrian/potential passenger has requested a pickup in a ride hail application operating on the passenger's personal electronic device. As used herein, the personal electronic device (PED) can be a cellular smart phone, smart watch, notebook device, or similar technology that is worn or carried, and the location of the PED (also, the target 132) is the same as the location of the passenger. In various embodiments, after the passenger requests a pickup, the ride hail application may communicate with an external ride hail server and determine a scope for the passenger's location, which is a geographic area around the passenger that is expected to include the passenger, and assign the vehicle 100 to pick up the passenger based on the scope.

In other embodiments, the method 300 may begin from the perspective of the vehicle module 104; in which case, the vehicle 100 is assumed to already be assigned, and the method 300 begins at 306, when the vehicle module 104 receives a request 202 for tether.

At 306, a request 202 for tether is sent to the vehicle module 104 in the vehicle 100 from the target module 134. As alluded to above, in various embodiments, the request 202 for tether can be transmitted from the target module 134 to the vehicle module 104 via an external ride hail server. The contents of the request 202 for tether are described above. In various embodiments, infrared signals are used instead of WiFi signals in the generation of the TPD. In these embodiments, the target 132 emits an agreed-upon encoded infrared signal and repetition frequency.

At 308, preliminary target localization is performed by the vehicle module 104, based on components of parsed information transmitted initially from the target module 134. In various embodiments, at 308, responsive to the preliminary target localization, the vehicle module 104 may generate commands for the drive systems to drive the vehicle 100 to the passenger's/target's location. In various embodiments, subsequent to assigning the vehicle 100, the vehicle 100 begins driving toward the target 132, and the vehicle-target localization does not begin until the vehicle 100 reaches a preprogrammed distance from the passenger.

At 310, the vehicle transmits the tether 204 to the target 132 (in operation, this is a communication between the vehicle module 104 and target module 134). The contents of the tether 204 may include a vehicle identification (e.g., a license plate, and description). In other embodiments, the contents of the tether 204 may include the vehicle identification and information about where the vehicle is, with respect to the location of the target 132. In still other embodiments, the contents of the tether 204 may include the vehicle profile data (VPD).

At 312, the vehicle module receives real-time (RT) TPD from the target module 134. In various embodiments, this communication is directly between the vehicle module 104 and the target module 134 and does not pass through an intermediary, such as the external ride hail server. At 314, the vehicle module 104 performs VT localization as described above. In various embodiments, VT localization includes using a thermal imaging camera in the camera system 118 to sense the agreed-upon encoded infrared signal. At 316, the V-T localization date may be shared with the target module 134, and at 318, commands may be generated for various onboard systems and applications. After 318, the method 300 may end.

Thus, the provided system 102 and method 300 provide a technological solution to the technical problems that can occur with reliance on GPS exclusively for vehicle-target localization. Applications and modules that rely on vehicle-target localization, such as ride hail applications, may experience improved accuracy and speed when using the enhanced vehicle-target localization described herein, resulting in finding the target passenger sooner and more efficiently.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A system for vehicle-target (V-T) localization, comprising:
   a vehicle module operating onboard a vehicle and configured to receive a request for a tether and send the tether responsive thereto;
   a target module operating in a target external to the vehicle, wherein the target module configured to:
      generate target profile data (TPD) comprising location information for the target, the TPD having a first component that is a function of a detected first WiFi signal having a first signal strength;
      transmit the request for the tether including the TPD;
      receive the tether from the vehicle module; and
      transmit real-time (RT) TPD to the vehicle module after receiving the tether;

the vehicle module further configured to perform the V-T localization as a function of the RT TPD and transmit V-T localization data to the target module;

the target module further configured to receive the V-T localization data from the vehicle module and update a status based thereon.

2. The system of claim 1, wherein the vehicle module is further configured to generate the tether to include vehicle profile data and a vehicle identification.

3. The system of claim 2, wherein the target module is further configured to generate the TPD further comprising a second component that is a function of a detected second WiFi signal having a second signal strength.

4. The system of claim 3, wherein the vehicle module is further configured to perform V-T localization by:
parsing the RT TPD into its components; and
referencing map data to locate a respective source ID for each component.

5. The system of claim 4, wherein the vehicle module is further configured to generate commands for drive systems of the vehicle as a function of the V-T localization.

6. The system of claim 4, wherein the vehicle module is further configured to generate commands for a display device in the vehicle as a function of the V-T localization.

7. The system of claim 4, wherein:
the target module is further configured to generate the TPD further comprising an encoded infrared component; and
the vehicle module is further configured to parse the TPD into the encoded infrared component and utilize an onboard camera system in the performance of the V-T localization.

8. The system of claim 4, wherein the target module is further configured to:
perform a validation step to authorize the tether; and
only transmit the RT TPD when the tether is authorized.

9. The system of claim 8, wherein the validation step includes confirming that the tether was transmitted by an intended vehicle.

10. The system of claim 9, wherein the target is a personal electronic device or embedded system in an enabled transport object.

11. A method for vehicle-target (V-T) localization, comprising:
at a vehicle module located onboard a vehicle,
receiving a request for a tether for a target that is external to the vehicle;
performing a preliminary target localization for the target as a function of components in the request for the tether; and
transmitting the tether; and
at a target module onboard the target,
wherein the request for tether includes components of target profile data (TPD), generating the TPD to include a first component that is a function of a detected first WiFi signal having a first signal strength or its own WiFi ID information;
transmitting the request for the tether including the TPD;
receiving the tether from the vehicle module; and
transmitting real-time (RT) TPD to the vehicle module responsive to receiving the tether; and
at the vehicle module, further performing the V-T localization as a function of the RT TPD and transmitting V-T localization data to the target module.

12. The method of claim 11, further comprising, at the vehicle module, generating the tether to include vehicle profile data and a vehicle identification.

13. The method of claim 12, further comprising, at the target module, generating the TPD to further comprise a second component that is a function of a detected second WiFi signal having a second signal strength.

14. The method of claim 13, further comprising, at the vehicle module:
performing the V-T localization by parsing the RT TPD into its components; and
referencing map data to locate a respective source ID for each component.

15. The method of claim 14, further comprising, at the vehicle module, generating commands for drive systems of the vehicle as a function of the V-T localization.

16. The method of claim 14, further comprising, at the vehicle module, generating commands for a display device in the vehicle as a function of the V-T localization.

17. The method of claim 14, wherein:
further comprising, at the target module, generating the TPD further comprising an encoded infrared component; and
further comprising, at the vehicle module, parsing the TPD into the encoded infrared component and utilizing an onboard camera system in the performance of the V-T localization.

18. The method of claim 14, further comprising, at the target module: performing a validation step to authorize the tether; and
only transmitting the RT TPD when the tether is authorized.

19. The method of claim 18, wherein the validation step includes confirming that the tether was transmitted by an intended vehicle.

20. The method of claim 19, wherein the target is a personal electronic device.

* * * * *